US011312458B2

(12) United States Patent
Forrester et al.

(10) Patent No.: US 11,312,458 B2
(45) Date of Patent: Apr. 26, 2022

(54) WATERCRAFT

(71) Applicant: BAE SYSTEMS plc, London (GB)

(72) Inventors: Daniel Martyn Forrester, New Malden (GB); Owen Edward Jones, New Malden (GB); Jonathan Paul Ker Goodwin, New Malden (GB)

(73) Assignee: BAE SYSTEMS PLC, London (GB)

( * ) Notice: Subject to any disclaimer, the term of this patent is extended or adjusted under 35 U.S.C. 154(b) by 307 days.

(21) Appl. No.: 16/608,487

(22) PCT Filed: Apr. 24, 2018

(86) PCT No.: PCT/GB2018/051064
§ 371 (c)(1),
(2) Date: Oct. 25, 2019

(87) PCT Pub. No.: WO2018/197853
PCT Pub. Date: Nov. 1, 2018

(65) Prior Publication Data
US 2020/0180741 A1    Jun. 11, 2020

(30) Foreign Application Priority Data

Apr. 25, 2017    (EP) ..................................... 17275059
Apr. 25, 2017    (GB) ..................................... 1706514

(51) Int. Cl.
*B63G 13/00*        (2006.01)
*B63B 49/00*        (2006.01)
(Continued)

(52) U.S. Cl.
CPC .............. *B63G 13/00* (2013.01); *B63B 49/00* (2013.01); *G02B 27/0172* (2013.01);
(Continued)

(58) Field of Classification Search
CPC ... G02B 27/0172; B63B 49/00; G06T 19/006; B63G 13/00
See application file for complete search history.

(56) References Cited

U.S. PATENT DOCUMENTS 6,181,302 B1    1/2001    Lynde
2012/0120498 A1*    5/2012    Harrison ............ G02B 27/0093
359/630

(Continued)

FOREIGN PATENT DOCUMENTS

EP    1842771 A1    10/2007
FR    3026506 A1    4/2016
(Continued)

OTHER PUBLICATIONS

International Search Report and Written Opinion received for PCT Application No. PCT/GB2018/051064, dated Jun. 26, 2018. 16 pages.
(Continued)

*Primary Examiner* — Ryan R Yang
(74) *Attorney, Agent, or Firm* — Finch & Maloney PLLC

(57) ABSTRACT

According to an aspect of the present invention, there is provided a watercraft comprising: a management system for use in managing functionality associated with the watercraft; an augmented reality system arranged to interact with the management system, at least a part of the augmented reality system being arranged to be wearable by a user of the watercraft to provide augmented reality image data to the user based on the interaction between the augmented reality system and the management system.

20 Claims, 4 Drawing Sheets

Figure 1:
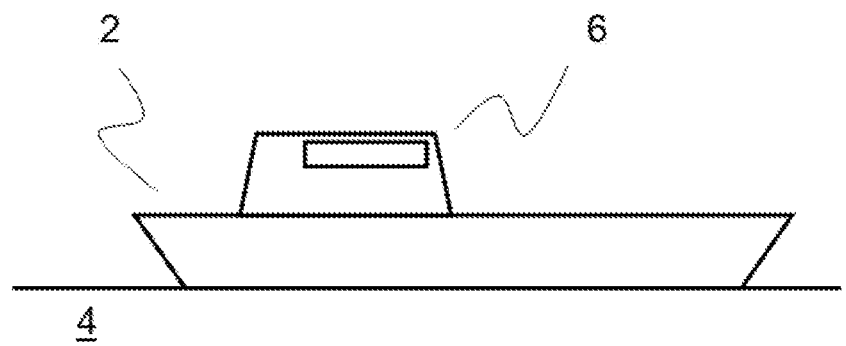

(51) Int. Cl.
 G02B 27/01 (2006.01)
 G06F 3/01 (2006.01)
 G06T 19/00 (2011.01)
(52) U.S. Cl.
 CPC .............. G06F 3/011 (2013.01); G06F 3/017 (2013.01); G06T 19/006 (2013.01); *G02B 2027/0134* (2013.01); *G02B 2027/0178* (2013.01)

(56) References Cited

U.S. PATENT DOCUMENTS

| | | |
|---|---|---|
| 2014/0240313 A1 | 8/2014 | Varga |
| 2016/0167672 A1 | 6/2016 | Krueger |
| 2017/0053444 A1 | 2/2017 | Huang et al. |
| 2017/0076503 A1* | 3/2017 | Tamaoki .................. G06F 3/017 |
| 2018/0018933 A1* | 1/2018 | Rehmeyer ............ G02B 27/017 |

FOREIGN PATENT DOCUMENTS

| | | |
|---|---|---|
| WO | 2017031089 A1 | 2/2017 |
| WO | 2018197853 A1 | 1/2018 |

OTHER PUBLICATIONS

GB Search Report under Section 17(5) received for GB Application No. 1706514.5 dated Sep. 27, 2017. 5 pages.
Extended European Search Report received for EP Application No. 17275059.8, dated Nov. 2, 2017. 8 pages.
Van Kluijven, P.C., Augmented reality used in navigation. Project 2 Theme: improvement and innovation Content, Feb. 5, 2013, XP055199421, Retrieved from the Internet on Jul. 1, 2015. 26 pages.
International Preliminary Report on Patentability received for PCT Application No. PCT/GB2018/051064, dated Nov. 7, 2019 9 pages.

* cited by examiner

WATERCRAFT

The present invention relates generally to a watercraft, and more specifically to a watercraft comprising an augmented reality system for interacting with a management system of that watercraft. A related method and arrangement are also provided.

Watercrafts come in a variety of different forms, ranging from small surface boats and related vessels, to large military, naval surface vessels. Watercrafts also encompass things such as hovercrafts and submersibles. All but the very simplest of watercraft will typically comprise of some form of management system, for use in managing functionality associated with that watercraft. At one extreme, such a management system might encompass a compass or other navigational aid, or even an engine management system. At perhaps the other extreme, in a military environment, a management system might comprise a full combat management system, which might comprise a computational device and software system and general package that in some way integrates all the sensors and weapon systems of the craft into a single system, possibly in combination with general management of command and control functionality. In any of these examples, a user of the watercraft will need to, at some point, engage with the management system in order to usefully and effectively interact with the watercraft.

User interaction with the management system of the watercraft is typically undertaken in a traditional and simplistic manner, for example viewing one or more dials or screens associated with or forming part of the management system. Interaction might comprise interacting with the management system by receiving visual outputs from such dials or screens, or providing input to the management system via one or more actuators (e.g. buttons, dials, and so on). Whilst such interaction might be satisfactory in some circumstances, it may not be satisfactory in others. For example, having to look at and interact with one or more dials, or screens, or similar, in order to interact with the watercraft may reduce situation awareness of the user, or increase workload of the user, or increase response time of the user, especially when multiple interactions are required. More generally, it may be difficult for the user to efficiently and effectively interact with the management system, when the interaction is in such a simplistic and traditional manner.

It is therefore an example aim of example embodiments of the present invention to at least partially avoid or overcome one or more disadvantages of the prior art, whether identified herein or elsewhere, or to at least provide a viable alternative to apparatus and methods of the prior art.

According to an aspect of the present invention, there is provided a watercraft comprising: a management system for use in managing functionality associated with the watercraft; an augmented reality system arranged to interact with the management system, at least a part of the augmented reality system being arranged to be wearable by a user of the watercraft to provide augmented reality image data to the user based on the interaction between the augmented reality system and the management system. The management system may comprise a combat management system, and image data provided by the augmented reality system is displayed adjacent to, or around, of the direct line of sight to any external craft or item, maintaining a clear view of the external craft or item.

The augmented reality system may be arranged to allow relatively unhindered movement of the user about the watercraft whilst still allowing for interaction with the management system.

The image data provided by the augmented reality system may be displayed adjacent to, or around, of the direct line of sight to an external craft or item when the user's view is centred on the external craft or item, or in front of an external craft or item in the direct line of sight when the user's view is not centred on the external craft or item.

The part of the augmented reality system that is arranged to be wearable by a user may be arranged to interact wirelessly with another part of the augmented reality system and/or the management system.

The part of the augmented reality system that is arranged to be wearable by a user may comprise one or more of: goggles; glasses; a headset.

The augmented reality system may be arranged to provide augmented reality binocular image data to the user.

The augmented reality system may be arranged to provide augmented reality stereoscopic image data to the user.

The part of the augmented reality system that is arranged to be wearable by a user may comprise a sensor for sensing one or more of: a movement of the part; and/or a location of the part; and/or an orientation of the part.

The management system may comprise or be in connection with a camera. The augmented reality system may provide image data to the user derived from imagery obtained by the camera.

The augmented reality system may comprise multiple different wearable parts, each part being wearable by a different user of the watercraft to provide augmented reality image data to each different user.

The interaction between the augmented reality system and the management system may comprise: the augmented reality system receiving and/or providing image data based on an output from the management system; and/or the augmented reality system receiving an input, or an input from the user, and providing the input to the management system.

The augmented reality system may be controllable by the user, such that the user can control the image data that is provided to the user.

The watercraft may be a naval watercraft.

According to an aspect of the present invention, there is provided an arrangement, comprising: a management system for use in managing functionality associated with a watercraft; an augmented reality system arranged to interact with the management system, at least a part of the augmented reality system being arranged to be wearable by a user of the watercraft to provide augmented reality image data to the user based on the interaction between the augmented reality system and the management system. The management system further comprises a combat management system, and image data provided by the augmented reality system is displayed adjacent to, or around, of the direct line of sight to any external craft or item, maintaining a clear view of the external craft or item.

According to an aspect of the present invention, there is provided a method of interacting with a management system of a watercraft, the management system being for use in managing functionality associated with the watercraft, the method comprising: a user of the watercraft using an augmented reality system to interact with the management system, at least a part of the augmented reality system being wearable by the user of the watercraft to provide augmented reality image data to the user based on the interaction between the augmented reality system and the management system, wherein image data provided by the augmented reality system is displayed adjacent to, or around, of the direct line of sight to any external craft or item, maintaining a clear view of the external craft or item.

It will be appreciated that features described in relation to the different aspects (e.g. watercraft, arrangement, method) may, unless clearly mutually exclusive based on the understanding of the skilled person from a reading of this disclosure, be combined or replaced with features of other aspects.

Figure 2:
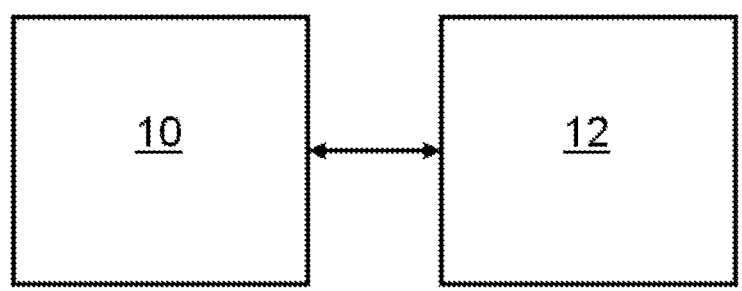
Figure 3:
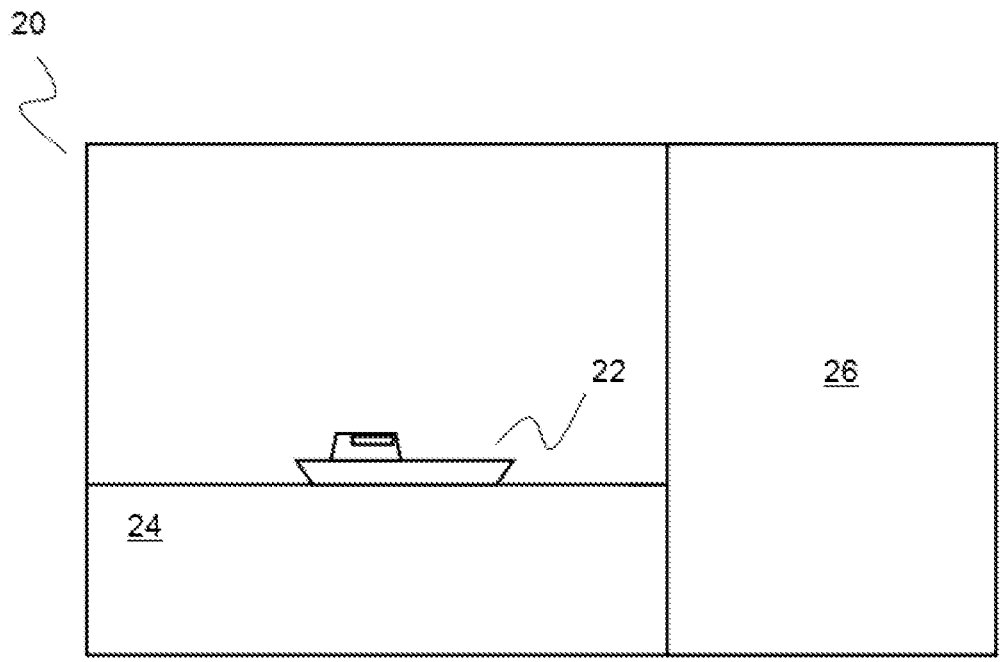
Figure 4A:
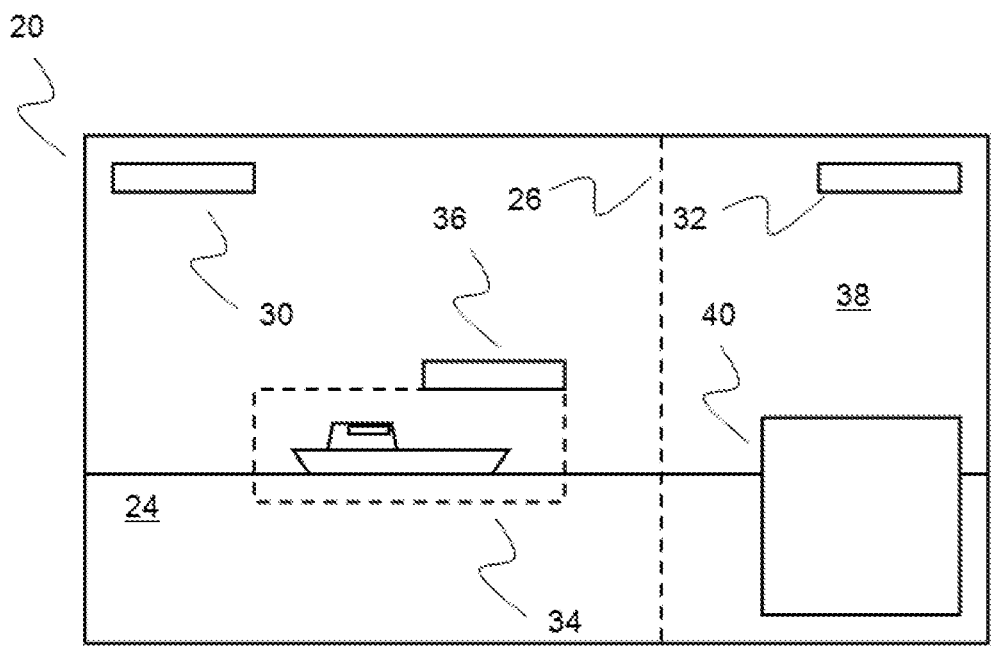
Figure 4B:
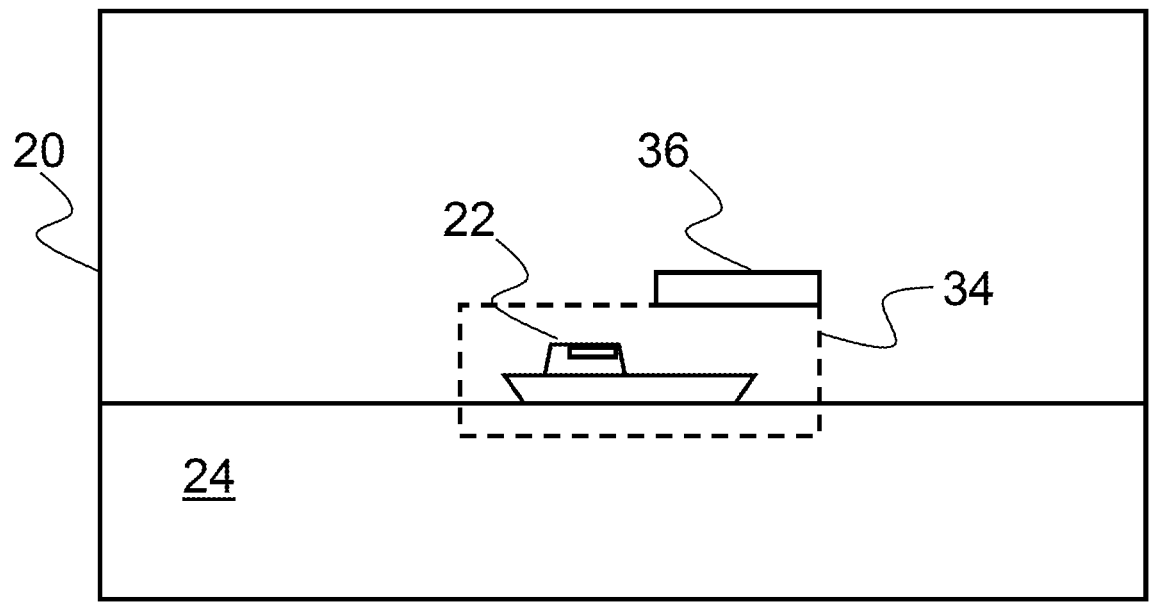
Figure 4C:
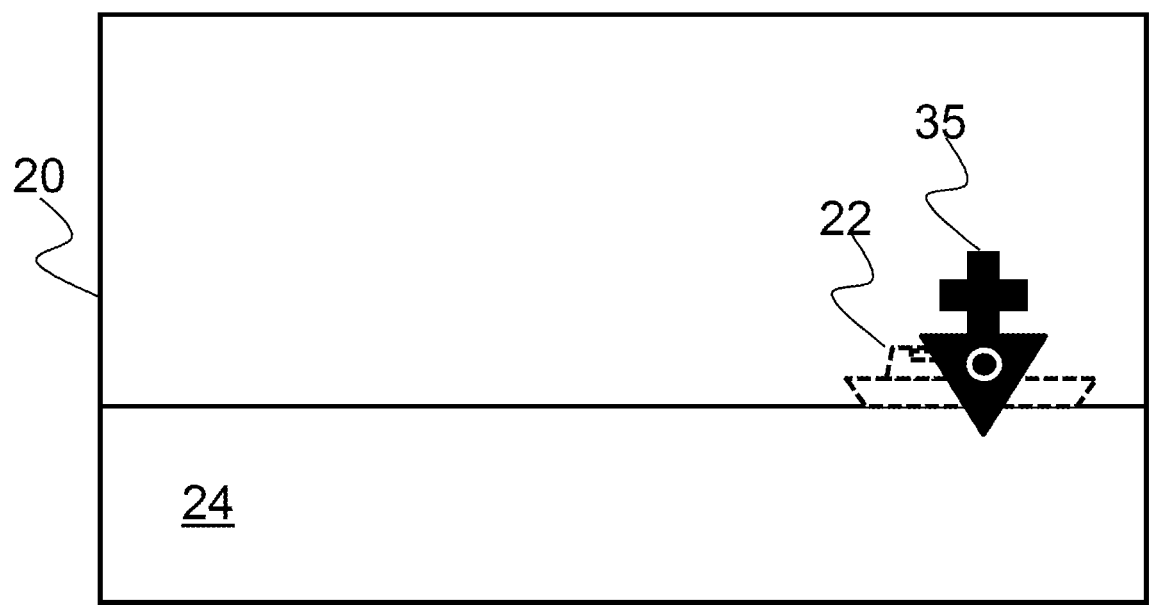
Figure 5:
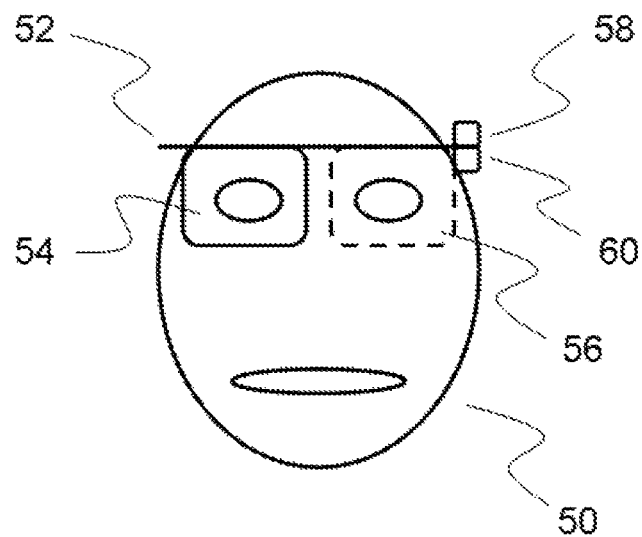
Figure 6:
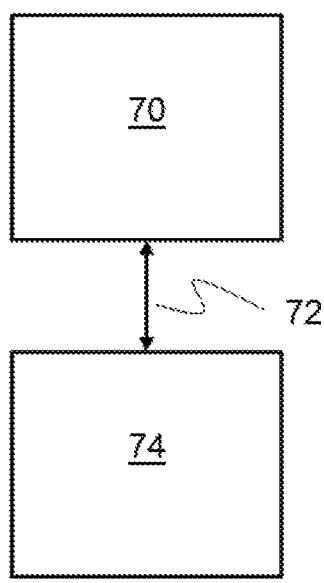

For a better understanding of the invention, and to show how embodiments of the same may be carried into effect, reference will now be made, by way of example, to the accompanying diagrammatic Figures in which:

FIG. 1 schematically depicts a watercraft;

FIG. 2 schematically depicts an arrangement for use with the watercraft of FIG. 1, the arrangement comprising a management system and an augmented reality system arranged to interact with the management system;

FIG. 3 schematically depicts a view of a user of the watercraft of FIG. 1, from that watercraft, when an augmented reality system is not present or is inactive;

FIGS. 4a, 4b and 4c schematically depict a view of a user of the watercraft of FIG. 1, from that watercraft, when an augmented reality system is used;

FIG. 5 schematically depicts a user of the watercraft of FIG. 1, wearing a part of an augmented reality system for use in interacting with a management system of that watercraft; and FIG. 6 schematically depicts a method of interacting with a management system of a watercraft using an augmented reality system.

FIG. 1 schematically depicts a watercraft 2. The watercraft 2 might take any form. For example, the watercraft may be a personal watercraft, such as a speed boat or similar. However, it is generally understood that the advantages associated with the present invention will likely apply more particularly to watercraft with management systems that are typically more complex than those associated with personal watercraft. For instance, management systems associated with more commercial watercraft might be more advanced, to the extent that they benefit more from the present invention. For instance, the watercraft might be a trawler, ocean liner, oil tanker, or other commercial watercraft that might have more advanced management systems than those typically associated with personal watercraft, such as small boats and the like. For example, a commercial craft might have more advanced navigational and control systems than a small, private or personal craft. A military, for example naval, watercraft will typically have the most advanced management systems, and might be more particularly suited to the advantages and benefits associated with the present invention. For example, naval watercraft, especially of the larger variety, will typically be provided with and use a (naval) combat management system, which is typically a computer system (and associated software) that in some way connects a naval watercraft's sensors, weapons, data links, support measures and other equipment to the officers and staff (users) performing tasks associated with the watercraft, and therefore generally interacting with that watercraft. For example, a combat management system might typically provide or involve functionality associated with sensor control and processing, threat evaluation and monitoring, weapons control, as well as perhaps more "core" interactions such as watercraft movement and general control.

In light of the preceding paragraph, the watercraft 2 is, for the purposes of describing this embodiment, taken to be a naval watercraft such as a surface warship or similar. However, the principles described herein are, of course, generally applicable to other types of watercraft, not necessarily associated with military activities.

As shown in FIG. 1, the watercraft 2 is, of course, typically used on water 4. The watercraft 2 comprises a bridge 6 or other form of general command and/or control centre. The bridge 6 is typically where general control of the watercraft 2 is undertaken, for example steering and navigation, weapons control, threat evaluation, and so on.

As discussed above, an existing user of an existing watercraft might engage with a management system of such a watercraft in a relatively simplistic and traditional manner. That is, the interaction would typically take the form of viewing one or more dials or screens where the dials and screens (or similar) can be viewed and generally interacted with—i.e. in a fixed position on the bridge of a craft. However, although such interaction may be generally effective in most instances, it has been found that the relatively simple and traditional modes of interaction can lead to a reduction in situation awareness, an increase in workload, an increase in response time, and perhaps what might generally be described as a general inefficiency in interacting with the management system of the watercraft. For instance, if a captain, watchkeeper or general user of a ship is viewing a map on a screen showing a current course of the watercraft, the captain of the ship cannot, at the same time, be visually monitoring a threat to the watercraft that is visible only when looking away from that screen. Alternatively, when the captain of that ship is viewing the perceived threat, the captain of the ship may have little or no information with regard to the current location of the watercraft that is being captained, or its course, or speed, and so on. Conversely, a user cannot currently look at information held in a (combat) management system about other craft or vehicles around that user (friendly or threats) whilst looking out of the window. Generally, then, there is a desire and need in the field of watercrafts to improve user interaction with management systems of such watercraft. The present invention provides a convenient, flexible and advantageous solution.

According to the present invention, there is provided a watercraft, or an arrangement for such a watercraft. The watercraft or arrangement comprises a management system for use in managing functionality associated with the watercraft. Additionally, there is provided an augmented reality system arranged to interact with the management system, at least a part of the augmented reality system being arranged to be wearable by a user of the watercraft in order to provide augmented reality image data to the user based on the interaction between the augmented reality system and the management system. That is, an augmented reality system is provided in order to provide the user with an augmented view of reality when using the watercraft and engaging and interacting with the management system of that watercraft.

Of course, augmented reality systems have been used in other fields for a number of years. However, it appears that the benefits associated with such augmented reality systems have in no way been contemplated for use in conjunction with watercraft. This could be for one or more of a number of reasons, for example a general reluctance to change in a somewhat traditional field of technology, and/or that simply engineers, technicians and designers in this field have simply not been able to contemplate the benefits to the field of watercrafts that would be forthcoming if augmented reality systems were used in conjunction with watercraft. The fact remains that no-one in this field have suggested or hinted at such use of augmented reality-based interaction. Generally speaking, the advantages of such use are numerous and significant, for example allowing for a greatly improved situation awareness, a reduced workload, reduced response time, the ability to steer sensors and aim weapons, to designate points of interest, and to, for example, assist piloting or general movement or navigation of the craft, e.g. during low visibility (whether due to weather conditions, conditions in a situation of danger or conflict, or general personal vision impairment, for example due to poor eyesight, colour blindness, reduced levels of consciousness, and so on). Generally, by using augmented reality systems, the user can engage with a management system of the watercraft, and so the watercraft in general, far more efficiently and effectively. This is particularly the case when the management system is a combat management system of a military, naval watercraft where rapid decision making and reactions are essential. That is, the use in a naval environment is not arbitrary, but is highly synergistic.

FIG. 2 depicts, in very general terms, an arrangement for use in the watercraft of FIG. 1. In FIG. 2, the arrangement is shown as comprising a management system 10 for use in managing functionality associated with a watercraft. The arrangement also comprises an augmented reality system 12 arranged to interact with the management system 10. At least a part of the augmented reality system 12 is arranged to be wearable by a user of the watercraft, to provide augmented reality image data to the user based on the interaction between the augmented reality system and the management system 10.

The image data that is provided can, as might be expected, be anything suitable to the particular application, ranging from 3D detailed graphics to simple numbers, text and symbols.

The augmented reality system 12 may be completely worn by a user, and receive data from the management system. Alternatively, there could be a processor or hub of the augmented reality system which receives data from the management system (and possibly at least partially physically or electronically integrated with the management system), and processes such data before transmission to a wearable part, allowing the wearable part to undertake less of such processing. This could allow the wearable part to be lighter, smaller, less cumbersome, more energy efficient, or cheaper.

FIGS. 3 and 4 are used to demonstrate how the user interaction with the management system may be improved by the use of an augmented reality system.

FIG. 3 shows the view 20 of a user from, for example, the bridge of the watercraft of FIG. 1. In FIG. 3, the augmented reality system may not be implemented in any way at all, or may simply not be activated. The view 20 shows that the user can see a watercraft 22 on the horizon, generally moving about a body of water 24. A significant portion of the user's view 20 is obscured by obstruction 26, which could be a part of the watercraft, for example, one or more struts of walls or similar.

It will be appreciated that the user's view 20 is rather simplistic, taking the form of imagery only obtainable by the human eye. In this case, the view 20 is simply the general, unaided, view of the user, for example from the bridge of a watercraft.

FIG. 4a shows a scenario when the same view 20 is augmented with image data from interaction with the management system of the user's watercraft. Even without going in to much detail, it can be immediately seen that the view and interaction is significantly enhanced.

By way of example only, the view 20 may be augmented with image data based on any one or more or a combination of interactions with the management system, to provide any information or otherwise that might be useful to the user. For instance, a course 30 of the user's watercraft may be provided in the view 20, perhaps in addition to a speed 32 of the user's watercraft. The watercraft 22 in view on the horizon may be in some way identified as a threat or otherwise by demarcation or markings 34, with perhaps some form of identification or threat level also provided 36. A range of information might be provided from the combat management system about the watercraft 22 being viewed (if available). This could include things such as classification, hostility, bearing, course, speed, closest point of approach, etc. This may also be used for some form of directed sensing or weapons targeting or similar.

A camera (not shown) forming part of the user's watercraft and interacting with the management system may be used to effectively remove or hide the obscuration 26. That is, in FIG. 4a, the view 20 of the user may be augmented with image data derived from imagery obtained by the camera to provide a virtual depiction or filling of the view 20 that would not otherwise be possible. One or more cameras may also be provided so that the user's view 20 may be augmented with image data from the view of a camera 40 facing in another direction, or perhaps being the view 40 of another user of the user's watercraft. This may provide a continuous, uninterrupted (up to 360 degrees) view from the user's watercraft.

In one example, and as shown in FIG. 4b, the augmented markings 34, 36 provided in relation to the external watercraft 22 are displayed adjacent to, or around of the direct line of sight to the watercraft 22. In this way, the augmented reality data does not obscure any part of the real-life view of the watercraft 22, and the user maintains a clear view of the watercraft 22 as well as the augmented information 34, 36.

In a further example, and as shown in FIG. 4c, the external watercraft 22 is identified in the augmented view 20 by an icon 35. The icon 35 is displayed in front of the watercraft 22 (i.e. in the direct line of sight) and clearly denotes the position, and possibly type, of the vessel in the user's view 20. In this example, the icon 35 is only displayed in front of the watercraft 22 when the user's view 20 is not centred on the watercraft 22. As the watercraft 22 moves into the centre of the user's view 20 (i.e. either as the watercraft 22 moves, the user's view re-orientates, or a combination of both), then the augmented icon 35 is replaced by the augmented markings 34, 36 as shown in FIG. 4b. As the watercraft 22 moves out of the centre of the user's view 20 (i.e. either as the watercraft 22 moves, the user's view re-orientates, or a combination of both), then the augmented icon 35 replaces the augmented markings 34, 36. In this way, the position and/or type information of any external vessel or item can be clearly seen by the user when the watercraft 22 is not centred in the user's view 20. When the user focusses or centres their view upon any external vessel or identified item, then additional information is displayed without obscuring the direct line of sight to the external vessel or identified item.

Although FIGS. 4a, 4b and 4c perhaps depict a theoretical and somewhat random array of augmented reality image data, it can nevertheless be seen from a comparison with FIG. 3 that the augmented view of reality could be extremely useful to a user of a watercraft when engaging with the management system of the watercraft. Again, this is particularly true when the management system is a combat management system of a naval watercraft, where rapid interaction, decision making and reactions are essential to the safe and effective operation of the naval watercraft and its crew.

Whilst the examples provided above have incorporated displaying augmented realist data for an external watercraft 22, it is to be understood that the augmented reality system disclosed within this application is also able to identify and label other crafts and vehicles, from air, land or sea, including small craft. Other items identifiable by the system may comprise, for example, shipping buoys, land formations, rocky outcrops, lighthouses, shipping channels or known landmarks. The system is also capable of highlighting and displaying information about craft and items that are not directly visible from the user's watercraft, for example due to fog or being over-the horizon. One way of implementing the augmented reality system would be for a user to enter into a dedicated cabinet or space in the watercraft, where the augmented view of reality could be provided to the user. In another example, perhaps windows of the watercraft could be arranged for augmented viewing, for example by way of transmissive or projection display technology. However, it is extremely beneficial if, instead, the augmented reality system is personal to the user, and also beneficial if the system is arranged to allow relatively unhindered movement of the user about the watercraft whilst still allowing for interaction with the management system. Although this is a somewhat functional definition, it will be clear to someone skilled in the field. For example, the augmented reality system, or at least the part worn by the user, should be relatively portable so that the user can walk around the watercraft and undertake relatively normal duties without being hindered by the augmented reality system. To that extent, the augmented reality system, or part thereof worn by the user, should be relatively lightweight and portable, and preferably wirelessly interact with the management system so that there is no need for wires trailing across the watercraft in order to implement the required interaction. One or more users may each have their own wearable part, so that each user can have a personally augmented view, or simply so that the orientation, location and movement of the user can be taken in to account in the augmentation.

FIG. 5 shows that a preferred implementation of the part of the augmented reality system worn by a user 50 might comprise goggles, glasses, or a headset 52. The goggles, glasses, or headset 52 might be bespoke for the particular application, for example formed from certain materials, or with providing certain levels of brightness, or blocking of external light or similar. Alternatively, the goggles, glasses, or headset 52 may be based on or even be a commercial off-the-shelf product, for example based on existing consumer goggles, glasses or headsets, possibly with some modifications for the particular application.

The goggles, glasses, or headset 52 may comprise a single eye piece 54, or screen, or similar, or other element for providing the image data to the user 50. This may be satisfactory in some instances. However, it is common for users of watercraft, and in particular users of naval watercraft, to use binoculars when generally interacting with the environment in which the watercraft is being used. So, the goggles, glasses or headset 52 might conveniently comprise two eye pieces, or screens, or other element providing image data to the user 50, which allows the provision of binocular 54, 56 image data to the user. So, this approach might find synergy with users of watercraft, who are already typically used to using binocular systems. This might also conveniently allow for the image data provided to the user to be stereoscopic in nature, allowing 3-dimensional representations of the views or data to be provided to the user 50 in a relatively straightforward manner. This approach might allow the view of the user to be augmented in a very intuitive way, for example in a 3-dimensional manner which allows for the image data to be provided to the user with a depth or otherwise that fits in well with the unaided (not augmented) view of reality of that user. For instance, the image data can be made to fit and sit well within a view, as opposed to simply being a 2-dimensional overlay on a 2-dimensional reality.

Depending on the level and nature of interaction of the user with the management system, the augmented reality system could be quite simplistic, and simply provide image data that is independent of movement of the user, location of the user, or orientation of the user. For example, the course and speed of the craft might be usefully provided to the user, regardless of the movement, location, or orientation of the user. However, more advanced image data and therefore interaction, might be useful, for example when steering sensors or targeting weapons, or in any way providing for augmented reality interaction with the management system that is usefully dependent on the movement of the user, location of the user, or orientation of the user. So, referring back to FIG. 5, the goggles, glasses or headset 52 might be provided with one or more sensors 58 for sensing one or more of a movement of the goggles, glasses or headset 52, or a location or orientation thereof. This sensor 58 might comprise one or more gyroscopes or accelerometers or GPS (or similar) elements for use in achieving such sensing. Sensed data can be transmitted to the management system, or part of the augmented reality system receiving data from that management system, so that the image data is provided, or processed for viewing, taking into account changes in location, orientation or movement of the goggles, glasses or headset 52 (and therefore user 50).

Generally speaking, the interaction between the augmented reality system and the management system will at least comprise the augmented reality system receiving image data from the management system and/or providing image data to the user based on an output from the management system. However, the interaction might also comprise the augmented reality system receiving an input (from the environment or similar) or an input from the user, and providing the input to the management system. To achieve this, the goggles, glasses of headset 52 might comprise one or more actuators or other elements 60 for allowing the user 50 to provide such input, or allowing the goggles, glasses or headset 52 to provide such an input without involvement of the user. The sensor 58 previously described might also provide this input.

Different forms of input can be envisaged ranging from confirmation or selection of actions, tracking of a user's gaze direction, an ambient lighting level, and so on. So the element for providing an input could be a button, a touch sensitive element a microphone, a camera, and so on, dependent on the required interaction.

The actuator 60 or other element 60 might also allow the user to exercise a degree of control of the augmented reality system, so that the user can control the image data that is provided to that user 50. For instance, the user might be able to interact with the augmented reality system to determine what image is provided, and when. This might be a simple on/off command, or far more graduated, for example allowing certain image data to be provided as and when required. This could be very specific, in terms of allowing each image data element to be activated or deactivated, or the display of image data could be somehow grouped depending on, for example, a tier or level of interaction that is required with the management system. For instance, a low level of interaction might simply require the display of image data relating to bearing and speed or similar, whereas a far more advanced or higher level of interaction might take the form of something similar to that show in FIG. 4a, where far more, or richer, image data is provided to the user.

It will be appreciated that if there are multiple users of the watercraft, more than one user of those users may be provided with wearable parts of the augmented reality system (e.g. goggles, glasses, headsets and so on) so that they can each benefit from the interaction with the management system as described above, even if not to the same extent as each other. Again, wireless or otherwise relatively unhindered interaction with the management system will allow the users of the watercraft to operate in a fairly normal manner, even when using the augmented reality system.

The augmented reality system described so far has used image data as the data that is provided to the user. Audio data might also be provided. For example, spatial audio could be used to give directional indications to the user about information that is currently outside of their field of view.

Image data displayed to the user, and pertaining to external objects (e.g. other watercraft) will likely need to take into account the motion of the user's watercraft itself, as well as the movement of the wearable part of the augmented reality system. This is a significant difference from other more standard uses of augmented reality on land.

FIG. 6 schematically depicts general methodology associated with embodiments described above. FIG. 6 is generally depicting a method of interacting with a management system of a watercraft, the management system being for use in managing functionality associated with the watercraft. The method comprises a user of the watercraft using an augmented reality system 70 to interact 72 with the management system 74. A part of the augmented reality system is wearable by the user of the watercraft to provide augmented reality image data to the user based on the interaction 72 between the augmented reality system 70 and the management system 74.

It will be appreciated that the augmented reality system described above, and the interaction with the management system, may be implemented when new watercrafts are built, or when new arrangements and management systems for such watercrafts are built and installed. However, it is also possible for the augmented reality system described above to be installed retrospectively on existing watercraft (that is, retrofitted), and in conjunction with existing management systems. For instance, data that is already available and being used in existing management systems may be used to provide or derive image data suitable for presentation to a user of the watercraft, for providing an improved, augmented view of reality for that user of the watercraft.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus, comprising:
a management system for use in managing functionality associated with a watercraft, the management system comprising a combat management system; and
an augmented reality system arranged to interact with the management system, at least a part of the augmented reality system being arranged to be wearable by a user of the watercraft to provide augmented reality image data to the user based on the interaction between the augmented reality system and the management system, wherein image data in relation to any external craft or item provided by the augmented reality system is displayed
adjacent to, or around, a direct line of sight to the external craft or item, in response to the user's view being centered on the external craft or item; and
in front of the external craft or item in the direct line of sight, in response to the user's view not being centered on the external craft or item.

2. The apparatus of claim 1, wherein the augmented reality system is arranged to allow relatively unhindered movement of the user about the watercraft whilst still allowing for interaction with the management system.

3. The apparatus of claim 1, wherein the part of the augmented reality system that is arranged to be wearable by a user is arranged to interact wirelessly with another part of the augmented reality system and/or the management system.

4. The apparatus of claim 1, wherein the part of the augmented reality system that is arranged to be wearable by a user comprises one or more of:
goggles;
glasses;
a headset; and/or
a display.

5. The apparatus of claim 1, wherein the augmented reality system is arranged to provide augmented reality binocular image data to the user.

6. The apparatus of claim 1, wherein the augmented reality system is arranged to provide augmented reality stereoscopic image data to the user.

7. The apparatus of claim 1, wherein the part of the augmented reality system that is arranged to be wearable by a user comprises a sensor for sensing one or more of:
a movement of the part;
a location of the part; and/or
an orientation of the part.

8. The apparatus of claim 1, wherein the management system comprises or is in connection with a camera, and the augmented reality system provides image data to the user derived from imagery obtained by the camera.

9. The apparatus of claim 1, wherein the augmented reality system comprises multiple different wearable parts, each part being wearable by a different user of the watercraft to provide augmented reality image data to each different user.

10. The apparatus of claim 1, wherein the interaction between the augmented reality system and the management system comprises:
   the augmented reality system receiving and/or providing image data based on an output from the management system; and/or
   the augmented reality system receiving an input, or an input from the user, and providing the input to the management system.

11. The apparatus of claim 1, wherein the augmented reality system is controllable by the user, such that the user can control the image data that is provided to the user.

12. A watercraft comprising the apparatus of claim 1, wherein the watercraft is a naval watercraft.

13. A watercraft comprising the apparatus of claim 1.

14. An apparatus, comprising:
   a management system for use in managing functionality associated with a vehicle; and
   an augmented reality system arranged to interact with the management system and including one or more displays, at least a part of the augmented reality system being arranged to be wearable by a user to provide augmented reality image data to the user based on the interaction between the augmented reality system and the management system, wherein image data in relation to any external item provided by the augmented reality system is displayed
      adjacent to, or around, of a direct line of sight to the external item, in response to the user's view being centered on the external item; and
      in front of the external item in the direct line of sight, response to the user's view not being centered on the external item.

15. The apparatus of claim 14, wherein the part of the augmented reality system that is arranged to be wearable by a user is arranged to interact wirelessly with another part of the augmented reality system and/or the management system, and wherein the part of the augmented reality system that is arranged to be wearable by a user comprises one or more of:
   goggles;
   glasses;
   a headset; and/or
   a display.

16. The apparatus of claim 14, wherein the augmented reality system is arranged to provide one or both of augmented reality binocular image data and/or augmented reality stereoscopic image data to the user, and wherein the part of the augmented reality system that is arranged to be wearable by a user comprises a sensor for sensing one or more of:
   a movement of the part;
   a location of the part; and/or
   an orientation of the part.

17. The apparatus of claim 14, wherein the augmented reality system comprises multiple different wearable parts, each part being wearable by a different user of the watercraft to provide augmented reality image data to each different user.

18. The apparatus of claim 14, wherein the interaction between the augmented reality system and the management system comprises:
   the augmented reality system receiving and/or providing image data based on an output from the management system; and/or
   the augmented reality system receiving an input, or an input from the user, and providing the input to the management system.

19. A watercraft comprising the apparatus of claim 14, wherein the watercraft is a naval watercraft, wherein the management system comprises a combat management system.

20. A method of interacting with a management system of a watercraft, the management system being for use in managing functionality associated with the watercraft, the method comprising:
   interacting, by an augmented reality system, with the management system, at least a part of the augmented reality system being wearable by a user of the watercraft to provide augmented reality image data to the user based on the interaction between the augmented reality system and the management system; and
   causing display, by the augmented reality system, image data in relation to any external craft or item provided by the augmented reality system, such that the image data is displayed
      adjacent to, or around, of a direct line of sight to the external craft or item, response to the user's view being centered on the external craft or item; and
      in front of the external craft or item in the direct line of sight, in response tothe user's view not being centered on the external craft or item.

* * * * *